United States Patent [19]
Block et al.

[11] 3,954,606
[45] May 4, 1976

[54] WASTEWATER TREATMENT SYSTEM WITH CONTROLLED MIXING

[75] Inventors: Charles S. Block, Allentown; Michael S. Chen, Macungie; Olaf J. Noichl, Whitehall, all of Pa.

[73] Assignee: Air Products and Chemicals, Inc., Allentown, Pa.

[22] Filed: Nov. 12, 1973

[21] Appl. No.: 414,770

[52] U.S. Cl. .................................. 210/14; 210/15; 261/91
[51] Int. Cl.² ........................................ C02C 1/02
[58] Field of Search ............ 210/63, 199, 195, 194, 210/14, 219, 15, 241, 320; 261/91, 92; 259/103, 104

[56] References Cited
UNITED STATES PATENTS

| | | | |
|---|---|---|---|
| 2,337,384 | 12/1943 | Gould | 210/199 |
| 3,133,017 | 5/1964 | Lambeth | 210/15 |
| 3,236,384 | 2/1966 | Sontheimer | 210/219 |
| 3,356,347 | 12/1967 | Boschen | 259/104 |
| 3,403,099 | 9/1968 | Dixon | 210/63 |
| 3,426,899 | 2/1969 | Smith | 261/91 |
| 3,547,813 | 12/1970 | Robinson | 210/15 |
| 3,547,815 | 12/1970 | McWhirter | 210/15 |
| 3,559,964 | 2/1971 | Kelsterback et al. | 261/91 |
| 3,701,727 | 10/1972 | Kormanik | 210/219 |
| 3,709,364 | 1/1973 | Savage | 210/195 |
| 3,725,258 | 4/1973 | Spector | 210/7 |
| 3,733,264 | 5/1973 | Spector | 210/195 |
| 3,796,788 | 3/1974 | Blickle | 261/123 |

OTHER PUBLICATIONS

Lelli, "Backmixing in Multistage Mixer Column," Chemical Engineering Science, Vol. 27, pp. 1109–1117, 1972.

Primary Examiner—Charles N. Hart
Assistant Examiner—Ernest Therkorn
Attorney, Agent, or Firm—Ronald B. Sherer; Barry Moyerman

[57] ABSTRACT

A wastewater treatment system of the activated sludge type is disclosed in which variable degrees of effective staging of the mixed liquor are achieved in an oxygenated aeration basin without the use of walls or partitions to physically divide the mixed liquor into separate liquid stages.

14 Claims, 1 Drawing Figure

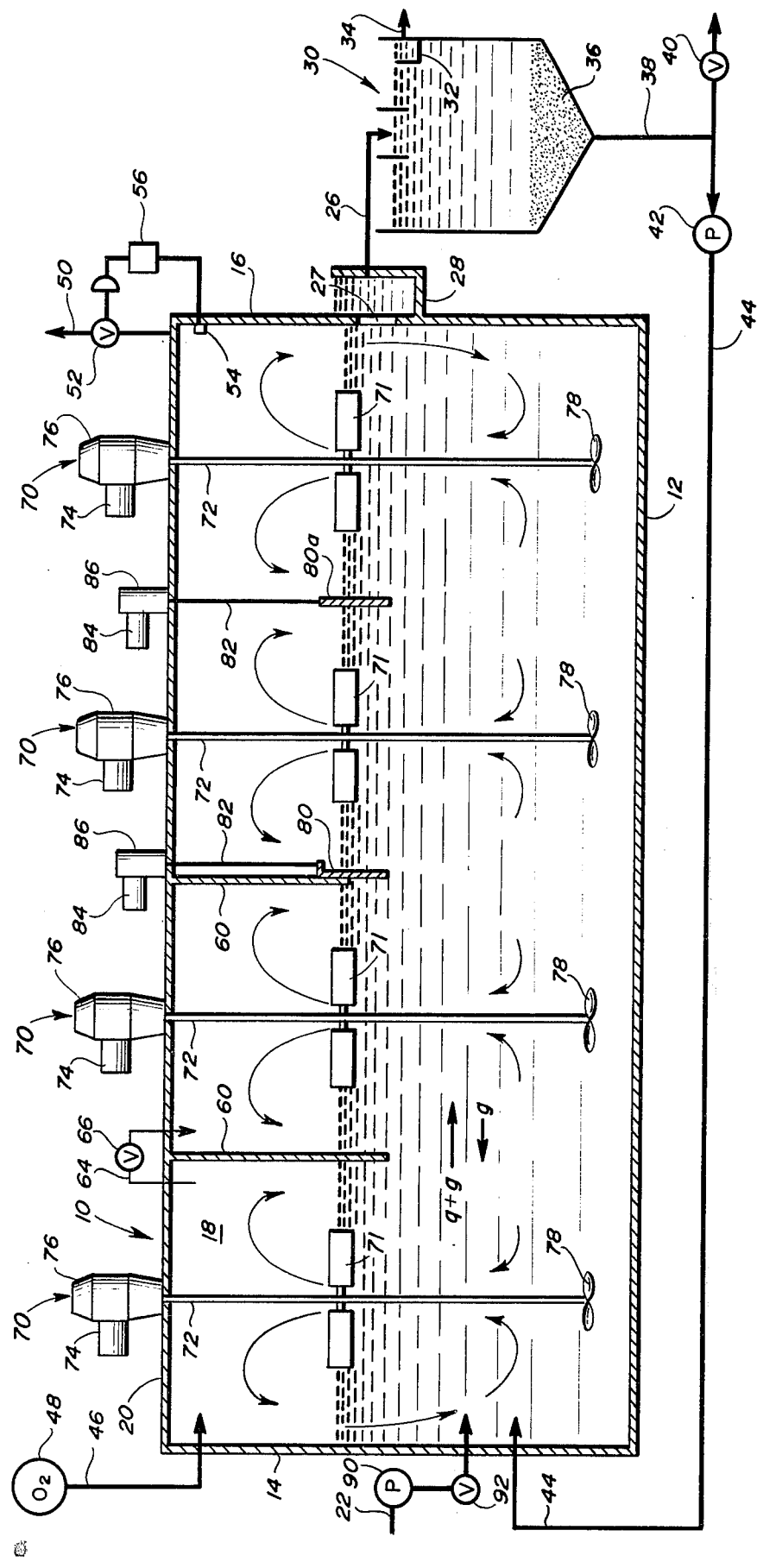

WASTEWATER TREATMENT SYSTEM WITH CONTROLLED MIXING

BACKGROUND OF THE INVENTION

In activated sludge-type systems for reducing the COD and BOD content of industrial and municipal liquid wastes, it has long been proposed to utilize oxygen-rich aeration gases in aeration basins in order to increase the rate of biological and chemical reactions, as opposed to, the use of atmospheric air in such aeration basins, The term "biochemical oxygen demand" will hereafter be used to include both the chemical oxygen deman (COD) and the biological oxygen demand (BOD). It has also been taught, for example, in U.S. Pat. Nos. 3,547,815 and 3,725,258 that the provision of walls or partitions which divide the aeration chamber into a plurality of physically separated liquid stages can be beneficial in progressively reducing the biochemical oxygen demand of the mixed liquor in a basin of minimum length by forcing the mixed liquor through successive liquid stages from the inlet end to the outlet end of the basin without backflow of the mixed liquor from a stage of lesser biochemical oxygen demand to an upstream stage of higher biochemical oxygen demand. This type of flow of the mixed liquor has been referred to as being "flow restricted", and is achieved by providing orifices of relatively small size in the partitions separating the stages such that the liquid flow is unidirectional from stage to stage.

On the other hand, previous systems are known such as, for example, that disclosed in U.S. Pat. No. 3,724,667 wherein the mixed liquor is not physically into stages, but rather, is completely mixed throughout the aeration basin so as to have a substantially uniform biochemical oxygen deman throughout the aeration basin. This latter type of system, referred to as a CMAS system, has the advantage that it will readily accommodate wide variations in the volume and strength of the influent, as well as, other types of shock loadings.

The present invention combines the advantages of both types of systems and is capable of achieving substantially the same advantages as the partitioned type of system without the need for such partitions extending vertically throughout the mixed liquor. Instead, it has been found that by selecting the initial design and/or controlling certain process parameters, the mixed liquor may be treated in a manner such that the amount of intermixing between non-partitioned zones of the basin may be controlled so as to achieve either the effect of a large number of physically separate liquid stages; i.e., "effective liquid staging," or to approach the conditions of a single zone, CMAS type system.

It is therefore a principal object of the present invention to provide an oxygenated waste treatment system wherein the amount of inter-zone mixing may be controlled so as to permit a more flexible operation which may be varied from conditions approaching the completely mixed mode of operation, to conditions approaching those of the physically partitioned, liquid stage mode of operation.

It is a further object of the present invention to provide an oxygenated waste treatment system having non-partitioned liquid zones while, at the same time, having a fixed or variable design capability of achieving a high degree of effective liquid staging.

SUMMARY OF THE INVENTION

The present invention provides a method and apparatus for aerating mixed liquor in an activated sludge-type system with oxygen-rich aeration gas wherein the degree of effective staging of the mixed liquor between the inlet and outlet of the aeration basin may be widely varied, and wherein the degree of inter-zone mixing of the mixed liquor between a downstream zone and an upstream zone may be controlled by the initial design, and/or by variable apparatus, such that the system may operate as though the liquid were physically separated into distinct stages without actually requiring such wall or partition structures, or may be operated so as to approach completely mixed conditions.

BRIEF DESCRIPTION OF THE DRAWING

The drawing is a simplified, schematic diagram of the essential components comprising one flow path of an activated sludge system illustrating one preferred embodiment of the present invention including alternative forms of some of the components which may be employed therein.

DETAILED DESCRIPTION

After extensive emperimentation regarding the hydraulic flow conditions which are involved in the operation of an aeration basin using surface aerators, it has been discovered that the amount of inter-zone mixing of mixed liquor between a downstream zone and an upstream zone is dependent on a plurality of operating parameters, and that of these parameters, certain parameters are controlling in determining the dimensionless ratio of $g/q$ as this term is known in the art, for example, as used by U. Lelli, F. Magelli and C. Sama in their article entitled "Backmixing in Multistage Mixer Columns" published in Chemical Engineering Science, Vol. 27, pages 1109–1117; this dimensionless ratio of $g/q$ being hereinafter referred to as the "backflow ratio". For example, it has been discovered that the backflow ratio is substantially affected by the ratio of the diamemter (D) of the surface impeller times the revolutions per minute (N) of the impeller divided by the liquid linear velocity (U); the liquid linear velocity (U) being defined as the volume per unit time ($q$) of mixed liquor introduced into and discharged from the aeration basin divided by the cross-sectional area (A) of the flow channel through the basin. The dimensionless ratio $N \times D/U$ will hereafter be referred to as the "aerator mixing factor".

In addition, it has been discovered that the backflow ratio is substantially affected by the extent to which the aeration gas baffles extend into the uppermost layer of the mixed liquor, or where aeration gas baffles are not employed, the extent to which auxiliary surface baffles extend into the uppermost layer of the mixed liquor, as will be more fully explained hereinafter.

The effect of the foregoing parameters, as well as the design considerations and the apparatus whereby these parameters may be varied will become more clearly apparent from consideration of the drawing wherein an elongated aeration basin 10 is illustrated as comprising a bottom wall 12, an inlet end wall 14, an outlet end wall 16, a pair of side walls 18 and a cover 20. Influent wastewater having a high biochemical oxygen demand which may comprise domestic sewage, industrial wastes, or both, and which may or may not have been pretreated in a primary treatment unit, is introduced through conduit 22 into the inlet end of the basin. Alternatively, the influent wastewater having a high biochemical oxygen demand may be introduced into several zones of the basin in the manner well known in the art as step aeration. The aerated mixed liquor is discharged from the aeration basin through conduit 26 which may be connected to a weir-type discharge channel 28 which is in fluid communication with the aeration basin by one or more apertures 27. The discharged effluent is introduced into a settler 30 from which the purified effluent may be discharged through an overflow weir 32 and discharge conduit 34 to a zone of disinfection or tertiary treatment, if necessary, or directly into a natural body of water such as a lake or stream. While the illustrated embodiment shows end wall 16 as defining the end of the aeration zone, it will be understood that the complete aeration process may be continued in additional channels of like construction collectively forming the complete flow path, and that such channels may be arranged in a serpentine pattern as is well known in the art as a multiple pass system.

Settler 30 operates in the conventional manner to separate the solids from the aerated mixed liquor, and the settled sludge 36 is discharged from the bottom of the settler through conduit 38. A portion of these solids may be discharged from the system through valve conduit 40 for disposal in a conventional manner, while a second portion of the activated sludge is returned through pump 42 and conduit 44 to the inlet end of the aeration basin. Of course, all of the activated sludge need not be introduced into the first zone of the basin as illustrated, but rather, portions thereof may be introduced at a plurality of locations along the first several zones, or the activated sludge may be premixed with wastewater influent in a premixing tank or by connecting recycle sludge line 44 directly to wastewater influent line 22. Thus, regardless of the particular configuration, the recycle sludge is mixed with the influent wastewater so as to form the mixed liquor in the aeration basin.

In order to support and substantially increase the rates of the biochemical reactions occurring in the aeration basin, an oxygen-rich aeration gas is supplied to the aeration basin 10 through a conduit 46 from a source 48. As used herein, the phrase "oxygen-rich" aeration gas is intended to mean a feed gas having an oxygen content by volume of at least 50%, and preferably comprising 75–100% oxygen. Thus, source 48 may take various forms including an oxygen producing plant of the cryogenic or adsorption type, or it may comprise a storage vessel containing liquefied oxygen which is vaporized to gaseous form and supplied through conduit 46 to the aeration basin. As will also be apparent, the oxygen-rich aeration gas may be supplied at locations other than the first zone, or at a plurality of locations.

The aeration basin is enclosed by gas-tight cover 20 such that, in the illustrated embodiment, the oxygen-rich aeration gas flows through each of the gas chambers above the liquid level from the inlet end of the outlet end of the basin from which it is discharged through conduit 50; howeve, depending upon where the oxygen-rich gas is injected, it may be discharged from other than above the last liquid zone as illustrated. Discharge line 50 is preferably provided with a control valve 52 which may be operated on an automatic basis by means of an oxygen sensing probe 54 and a controller 56 such that the aeration gas may be vented at any predetermined oxygen concentration. Alternatively, controller 56 may be eliminated for manual operation and/or additional air aeration zones may be added as disclosed in U.S. Pat. No. 3,725,258. The oxygen concentration of the vent gas may vary widely depending upon the specific application and the optimum mode of operation which is employed as more fully described in U.S. Pat. No. 3,725,258 and copending application Ser. No. 323,227. Where high oxygen content of the vent gas is desired, aeration gas baffles 60 may be eliminated. However, in the illustrated embodiment, it is preferred that baffles 60 be provided between each aerator so that the oxygen-rich aeration gas is staged, and the oxygen concentration thereof progressively decreases from the inlet end to the outlet end of the basin from which it is discharged from one of the latter stages at a relatively low oxygen concentration such as, for example, at less than 50% oxygen by volume, and preferably in the order of 20–40% oxygen. Accordingly, the illustrated embodiment shows two of such baffles 60 which may be secured to cover 20 and/or to sides 18 and which extend slightly below the level of the mixed liquor. The aeration gas may be passed from one gas stage to the next by the provision of orifices in baffles 60, or by overhead conduits 64 containing control valves 66. While the drawing illustrates baffles 60 as being provided between the first, second and third aerators, it is to be understood that such baffles 60 may be provided between all or any number of aerators.

In order to bring the mixed liquor into mass transfer contact with the oxygen-rich aeration gas, a plurality of surface aerators 70 are provided each of which includes a surface impeller 71 which is secured to a shaft 72 driven by a constant or variable speed motor 74 through a constant or variable speed gear reduction box 76. For reasons which will be subsequently explained in greater detail, gear reduction units 76 are preferably of the type which are not only capable of driving shafts 72 at desired speeds but also include the capability of raising or lowering impellers 71 within the limits of the vertical height of the impeller blades; such gear reduction units having a variable height adjustment capability being commercially available per se.

In those applications where the depth of the aeration tank is such that the suspended solids tend to settle to the bottom, shaft 72 may be extended and be provided with a submerged impeller 78 which serves only to keep the solids in suspension.

In view of the use of variable speed motors 74, or the use of variable speed gear reduction units 76, it will be apparent that the RPM of the surface aerator blades may be readily varied. Thus, the value of N may be varied so that the previously mentioned ratio of N × D/U may be varied, and thereby substantially vary and control the degree of intermixing between the non-partitioned liquid zones beneath the aerators. In addition to varying the value of N, the previously indicated capability to raise or lower the impeller so as to vary the depth of blade submergence into the mixed liquor provides a second variable operating parameter which varies the degree of inter-zone mixing. The number of blades per impeller, and the pitch thereof may also be selected in the initial design, or by replacement thereof, so as to vary the degree of inter-zone mixing. Thus, each of these parameters of design and operation may be selected or varied so as to change the backflow ratio.

Even where constant speed motors and gear boxes are employed, the desired value of the aerator mixing factor, ($N \times D/U$) may be achieved by the proper selection of the values of the impeller diameter (D), or the linear velocity (U), or both. For example, in designing a system according to the present invention, the size of the surface aerator may be selected so as to have a diameter which will achieve the desired value of the aerator mixing factor within the desired values hereinafter set forth. In addition, each of the individual surface aerators illustrated in the drawing may actually comprise multiple aerators of different impeller diameters such that one or more of the smaller or larger aerators may be alternatively or simultaneously driven depending upon the variations of the influent so as to maintain the aerator mixing factor within the desired range of values despite wide fluctuations of the influent conditions such as those resulting from diurnal or seasonal fluctuations. Thus, one or more of the aerators with the smaller diameters impellers may be driven during the usual nighttime conditions when the influent volume drops sharply which, in turn, reduces the value of the linear velocity (U). Conversely, the larger diameter aerators may be used with or without the smaller diameter impellers during peak daytime flowrates, and during peak flowrates occurring during seasonal periods such as during high rainfall seasons or periods of increased industrial activity. Also, different values of $N \times D/U$ may be selected for some of the aerators so that adjacent aerators of different mixing factors may co-act to produce varying degrees of the backflow ratio between their associated liquid zones.

When the wastewater influent flowrate increases for any of the above-indicated reasons, the value of (U) obviously increases with a consequent decrease in the value of $N \times D/U$ where (N) and (D) are fixed. However, it has been discovered that, since the backflow ratio decreases as the value of $N \times D/U$ decreases, the degree of effective staging increases. Therefore, a plant designed in accordance with the present invention has the inherent and unique ability to increase in efficiency when the wastewater influent flowrate exceeds the design capacity.

Normally, the linear velocity (U) is initially selected but, in some cases, it may be varied during operation of the waste treatment plant. The initial value may be determined by the proper selection of the cross-sectional area ($a$) of the flow channel for a given volume of influent per unit of time. In addition, in some cases it is contemplated that the influent volume per unit time may be varied or controlled by varying the rate of recycled sludge through pump 42, or by the provision of a variable speed pump 90 and/or valve 92 in the influent line 22. For example, the use of such pumps or valves to control the influent volume per unit time, and thereby control the linear velocity (U), can be accomplished where the complete waste treatment system includes an upstream primary settler which may also function as a surge tank to reduce and/or control volumetric flow variations, or where the complete aeration basin comprises a multiplicity of separate aeration flow paths or channels in parallel of which only one is illustrated. Thus, the influent flowrate to each aeration channel may be varied by using valves 92 to increases or decrease the number of such channels which are simultaneously in operation, and/or the pump speeds may be varied to change or maintain the influent flowrate.

Accordingly, the present invention contemplates that each of the parameters N, D and U may be initially selected, and/or varied individually or in various combinations, in order to determine and vary the aerator mixing factor $N \times D/U$, thereby initially determining and/or varying the backflow ratio during plant operation.

A second factor has also been discovered which significantly affects the degree of interzone mixing. This factor relates to the depth of penetration of the gas baffles into the mixed liquor. Accordingly, the present invention may include vertically movable surface baffles 80 which may be raised or lowered, for example by the provision of control rods 82 operated by motors 84 and gear reduction units 86. Of course, it will also be apparent that manual, hydraulic, pneumatic or mechanical systems may be substituted for the motors and gear units to raise and lower the movable baffles 80. Furthermore, it is to be understood that the movable baffles 80 may be provided whether or not the fixed baffles 60 are present, as illustrated by movable baffle 80a which is not accompanied by a fixed baffle between the last two zones of the illustrated embodiment. It is also to be understood that the present invention contemplates the use of non-movable surface baffles for those applications where variation in the depth of baffle penetration is not required. In those applications, fixed baffles having a predetermined length extending into the uppermost layer of the mixed liquor may be employed, and such fixed baffles may comprise the lower portion of the gas baffles 60, or separate short baffles, like baffles 80, but rigidly mounted instead of being movable. Thus, the term "surface baffle" is used herein to denote any type of baffle which extends a short distance into the upper portion or layer of the mixed liquor whether such baffle is fixed, movable, part of a gas baffle, or a separate baffle. Normally such surface baffles should extend across the major portion of the width of the flow path or channel basin, but they need not extend the full width depending upon a number of factors including, for example, the magnitude of desired backflow ratio, their depth of penetration, etc.

Having described the mechanical structure and the process parameters which have been discovered to enable the initial selection and variation of the degree of inter-zone mixing, the preferred and optimum values of these process parameters will now be described. In the above-mentioned tests, a pilot plant was operated having an aeration basin divided into five gas stages by gas baffles similar to baffles 60 with a surface aerator located within each of the five gas stages. This aeration basin had no liquid walls or partitions extending through the mixed liquor, but rather, was operated with gas baffles having various depths of penetration into the uppermost layer of the mixed liquor. If physical partitions had been provided extending through the mixed liquor between each aerator, it will be apparent that the maximum number of liquid stages would have been five. As a result of the experimentation with this pilot plant without such physical partitions, it was discovered that effective staging of 80% or more could be achieved when operating within the parameter values indicated under the column "Optimum Range" in Table I. That is, the system operated as though there were four or more physically separated liquid stages. Operations outside of the optimum range established a second "Preferred Range" in which effective staging of 60% or more was achieved, while operations within the broader ranges indicated as the "Operable Range" produced effective staging in the order of 30% or more.

TABLE I

| | PARAMETERS FOR EFFECTIVE STAGING | | |
|---|---|---|---|
| | OPERABLE RANGE | PREFERRED RANGE | OPTIMUM RANGE |
| g/q (backflow ratio) | 0.02–4.0 | 0.02–1.2 | 0.02–0.55 |
| N × D/U (aerator mixing factor) | 10–550 | 10–250 | 10–150 |
| Velocity (U), ft/sec. | 0.005–0.3 | 0.009–0.15 | 0.01–0.05 |
| % of Surface Baffle Penetration | 2–10% | 6–15% | 10–20% |

From the above-indicated data it has been discovered that for commercial aeration systems having depths of mixed liquor in the range of 8 to 25 feet, the surface baffle need only have a penetration depth in the range of 6 to 36 inches even where a high degree of effective staging is desired. At the same time, these pilot plant studies further indicated the degree to which the same physical system, or portions thereof, could be operated so as to approach a completely mixed activated sludge mode of operation; i.e., a CMAS mode as referred to in the art. The controlling parameters which were found to result in approaching a completely mixed mode of operation are given in Table II.

TABLE II

| PARAMETERS FOR APPROACHING CMAS MODE | |
|---|---|
| g/q (backflow ratio) | >4.0 |
| N × D/U (aerator mixing factor) | >550 |
| Velocity (U), ft/sec. | <0.005 |
| % of Surface Baffle Penetration | <2% |

It will therefore be understood that the present invention not only achieves a high degree of effective staging without walls or partitions extending through the mixed liquor, but also provides for the previously unobtainable flexibility of initially designing and/or operating an oxygenated waste treatment system in a variety of widely different modes. In addition, it further provides the capability of operating the inlet end portion of an oxygenated aeration basin in a mode approaching the CMAS mode in order, for example, to accommodate the frequently encountered and widely varying influent conditions while, at the same time, operating the remaining portion of the basin in an effective liquid staged mode such that the reduction of the biochemical oxygen demand is maximized per unit volume of the aeration basin.

Having described several preferred embodiments of the present invention, it will be apparent that numerous other modifications may be made without departing from the true scope of the invention. For example, the above-described structure may comprise only a portion of the total aeration system which may include one or more liquid stage formed by one or more partitions upstream and/or downstream of the non-partitioned liquid zones described hereinabove. Thus, the present invention includes the combination of upstream or downstream liquid partitioned stages in addition to the disclosed non-partitioned liquid zones which may be operated in a variety of modes as explained hereinabove.

Accordingly, these and other modifications of the invention will be apparent to those skilled in the art such that the full and true scope of the present invention is not to be limited other than as expressly set forth in the following claims including all equivalents thereof:

We claim:

1. The method of oxygenating and reducing the biological oxygen demand of a mixed liquor comprising the steps of:
   a. flowing said mixed liquor through an elongated, non-partitioned liquid zone of an aeration basin; said liquid zone being non-partitioned throughout at least 80% of the depth of said mixed liquor;
   b. introducing oxygen-rich aeration gas into said aeration basin;
   c. oxygenating said mixed liquor with said oxygen-rich aeration gas by rotating a plurality of surface aerators positioned at spaced locations along the length of said elongated, non-partitioned liquid zone;
   d. providing surface baffles between at least some of said surface aerators and maintaining the depth of penetration of said surface baffles into said mixed liquor within the range of 2 to 20% of the depth of said mixed liquor; and
   e. controlling the backflow ratio of the mixed liquor between adjacent aerators to produce effective liquid staging in the order of 30 to 80% or more by maintaining the aerator mixing factor N × D/U within the range of 10 to 550; where N is the RPM of the surface aerators, D is the diameter of the surface aerators, and U is the liquid linear velocity through the non-partitioned liquid zone.

2. The method as claimed in claim 1 wherein step (d) comprises controlling the backflow ratio of the mixed liquor between adjacent aerators by maintaining the aerator mixing factor N × D/U within the range of 10 to 250.

3. The method as claimed in claim 2 including the step of maintaining the linear velocity (U) of the mixed liquor within the range of 0.009–0.15 feet per second to assist in maintaining the aerator mixing factor N × D/U within the range of 10 to 250.

4. The method as claimed in claim 1 wherein step (d) comprises controlling the backflow ratio of the mixed liquor between adjacent aerators by maintaining the aerator mixing factor N × D/U within the range of 10 to 150.

5. The method as claimed in claim 4 including the step of maintaining the liner velocity (U) of the mixed liquor within the range of 0.01–0.05 feet per second to assist in maintaining the aerator mixing factor N × D/U within the range of 10 to 150.

6. The method as claimed in claim 1 including the step of varying the depth of penetration of said surface baffles so as to vary the backflow ratio.

7. The method as claimed in claim 1 including the step of varying the RPM of said surface aerators to assist in maintaining the aerator mixing factor N × D/U within said range.

8. The method as claimed in claim 1 including the step of varying the depth of aerator blade submergence to assist in maintaining the desired backflow ratio.

9. The method as claimed in claim 1 including the step of selecting the pitch and number of aerator blades to assist in maintaining the desired backflow ratio.

10. The method as claimed in claim 1 including the step of maintaining the linear velocity (U) of the mixed liquor within the range of 0.005–0.3 feet per second to assist in maintaining the aerator mixing factor N × D/U within said range.

11. The method as claimed in claim 1 including the step of maintaining the linear velocity (U) of the mixed liquor within the range of 0.009–0.15 feet per second to assist in maintaining the aerator mixing factor N × D/U within said range.

12. The method as claimed in claim 1 including the step of maintaining the linear velocity (U) of the mixed liquor within the range of 0.01–0.05 feet per second to assist in maintaining the aerator mixing factor N × D/U within said range.

13. The method of oxygenating and reducing the biological oxygen demand of a mixed liquor comprising the steps of:
   a. flowing said mixed liquor through an elongated, non-partitioned liquid zone of an aeration basin; said liquid zone being non-partitioned througout at least 80% of the depth of said mixed liquor;
   b. introducing oxygen-rich aeration gas into said aeration basin;
   c. oxygenating said mixed liquor with said oxygen-rich aeration gas by rotating a plurality of surface aerators positioned at spaced locations along the length of said elongated, non-partitioned liquid zone;
   d. providing surface baffles between at least some of said surface aerators and maintaining the depth of penetration of said surface baffles into said mixed liquor within the range of 2 to 20% of the depth of said mixed liquor;
   e. maintaining the aerator mixing factor N × D/U less than 550 in one portion of said non-partitioned liquid zone so as to operate said one portion in an effectively staged mode of operation; and
   f. maintaining the aerator mixing factor N × D/U greater than 550 in another portion of said non-partitioned liquid liquid zone so as to operate said other portion in a substantially completely mixed mode of operation.

14. The method as claimed in claim 13 wherein said mixed liquor is first passed through said other portion operating in a substantially completely mixed mode of operation, and thereafter is passed through said one portion operating in an effectively staged mode of operation.

* * * * *